United States Patent [19]

Frank

[11] Patent Number: 5,261,440

[45] Date of Patent: Nov. 16, 1993

[54] WATER SUPPLY SYSTEM FOR AN AIRCRAFT

[75] Inventor: Helge Frank, Hamburg, Fed. Rep. of Germany

[73] Assignee: Deutsche Aerospace Airbus GmbH, Hamburg, Fed. Rep. of Germany

[21] Appl. No.: 9,552

[22] Filed: Jan. 26, 1993

[30] Foreign Application Priority Data

Jan. 31, 1992 [DE] Fed. Rep. of Germany ....... 4202719

[51] Int. Cl.$^5$ .............................................. B64D 11/00
[52] U.S. Cl. ................... 137/209; 137/208; 137/899.2
[58] Field of Search ................. 137/207.5, 208, 209, 137/899.2

[56] References Cited

FOREIGN PATENT DOCUMENTS 882306 5/1943 France .

Primary Examiner—Gerald A. Michalsky
Attorney, Agent, or Firm—W. G. Fasse

[57] ABSTRACT

A water supply system for an aircraft is constructed to prevent freeze-up by causing the water to repeatedly flow back and forth between a water supply tank and one or more water displacement tanks. For this purpose, the displacement tank or tanks are connected through a pressurized pipe and through a switch-over valve to a junction between two series connected pressure controllers, preferably closed loop pressure controllers, that connect a source of gas pressure, such as air pressure, to a water tank, which in turn is connected through a water supply pipe to the water displacement containers and to respective faucets. A filling and draining valve is connected to the tank, to the water supply pipe, and to a venting and overflow pipe. A control unit switches the switch-over valve back and forth between a position in which the pressure in the pressure pipe transports the water from the displacement containers into the tank and another position in which the pressure in the tank transports the water from the tank into the displacement containers while some of the air in the displacement containers is vented. Such a back and forth movement prevents freeze-up and avoids the use of downwardly slanted pipe sections that lead to a drainage port. A plurality of displacement containers with respective valves are connected in parallel to each other between the pressure pipe and the water supply pipe.

12 Claims, 5 Drawing Sheets

WATER SUPPLY SYSTEM FOR AN AIRCRAFT

FIELD OF THE INVENTION

The invention relates to a water supply system for an aircraft, wherein a water tank is connected through a distribution water supply pipe to at least one, generally more than one, faucet. The water supply tank and the water supply pipe are connected in common to a filling and draining valve.

BACKGROUND INFORMATION

Such systems have a freeze-up problem when the aircraft flies at high altitudes or when the aircraft is parked outside at freezing temperatures, unless the water supply system has been drained. Heretofore, it has been customary to electrically heat at least those portions of the supply system which may become exposed to freezing temperatures. The supply of electrical energy to a parked aircraft may cause problems on the one hand. On the other hand, it may not be desirable to drain the water system, especially if the aircraft is parked only temporarily.

Further, the heating systems for these water pipes required a substantial expense for temperature sensors and controlled heating elements arranged along those portions of the supply pipe system which are most likely exposed to freezing temperatures.

Further, prolonged parking of an aircraft requiring drainage of the system is normally performed under the influence of gravity which means that all the supply pipes must be installed with a slant downwardly toward a drainage port. Such installation requirement for the supply pipes is undesirable, because it interferes with the installation of the same water supply system in aircraft model variations having different body lengths. In such case it is necessary to redesign the pipe system for each aircraft model separately in order to assure the required slant toward a drainage port. Both, the high energy consumption for heating the supply pipes and the installation requirements for gravity drainage are undesirable.

OBJECTS OF THE INVENTION

In view of the above it is the aim of the invention to achieve the following objects singly or in combination:

to provide a water supply system that can be operated at a substantially lower energy consumption, yet remains free of freeze-ups;

to permit the installation of supply pipes most convenient to the available space without regard to maintaining a certain downward slant in all the pipes;

to provide a water supply system that is easily adaptable to different types of aircraft; and to construct a water system in which the water is constantly caused to flow back and forth to and from a supply container so that freeze-ups will be prevented.

SUMMARY OF THE INVENTION

The above objects have been achieved according to the invention by the combination of the following features. A water supply tank is connected through a two stage pressure control system with a compressed air source and each faucet is connected to a water supply line and simultaneously to a water displacement container. The two stage pressure control system comprises two pressure controllers interconnected in series to form a junction to which a pressure supply pipe is connected. A switch-over valve is inserted in the pressure supply pipe which in turn is connected to the water displacement container or containers. More specifically the upper end of the displacement container or of each displacement container is connected to the pressure supply pipe while the lower end of each water displacement container is connected to the water supply pipe and to the respective faucet. The system also comprises a valve control unit which permits switching the switch-over valve for supplying compressed air to the water displacement containers or for permitting a backflow operation, whereby compressed air is removed from the water displacement containers. This system constantly moves the water into the displacement containers from the water supply tank or in the opposite direction into the water supply tank from the displacement containers, whereby freeze-up is prevented.

It is a special advantage of the invention that the operation of the compressed air supply requires substantially less energy than the conventional heating systems. Another advantage is seen in that the present system is easily adaptable or modifiable with regard to the requirements made by aircraft having different body length, so that a redesign of the water supply system is not necessary according to the invention.

By providing a flow controlling throttling device in the air pressure supply pipe to the water displacement container, it is assured that each of these containers is uniformly emptied and again filled.

By positioning another flow control throttling device in the pressurized air duct leading into the water supply tank or in a venting pipe leading from the supply tank, it is assured that the escape of pressurized air through the water tank and through the venting pipe is kept in acceptable limits whilst filling or draining the system.

By properly positioning a bubble trap upstream of the drainage connection between the tank and the filling and draining valve, it is assured that air bubbles do not interfere with the complete emptying of the system if desired.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
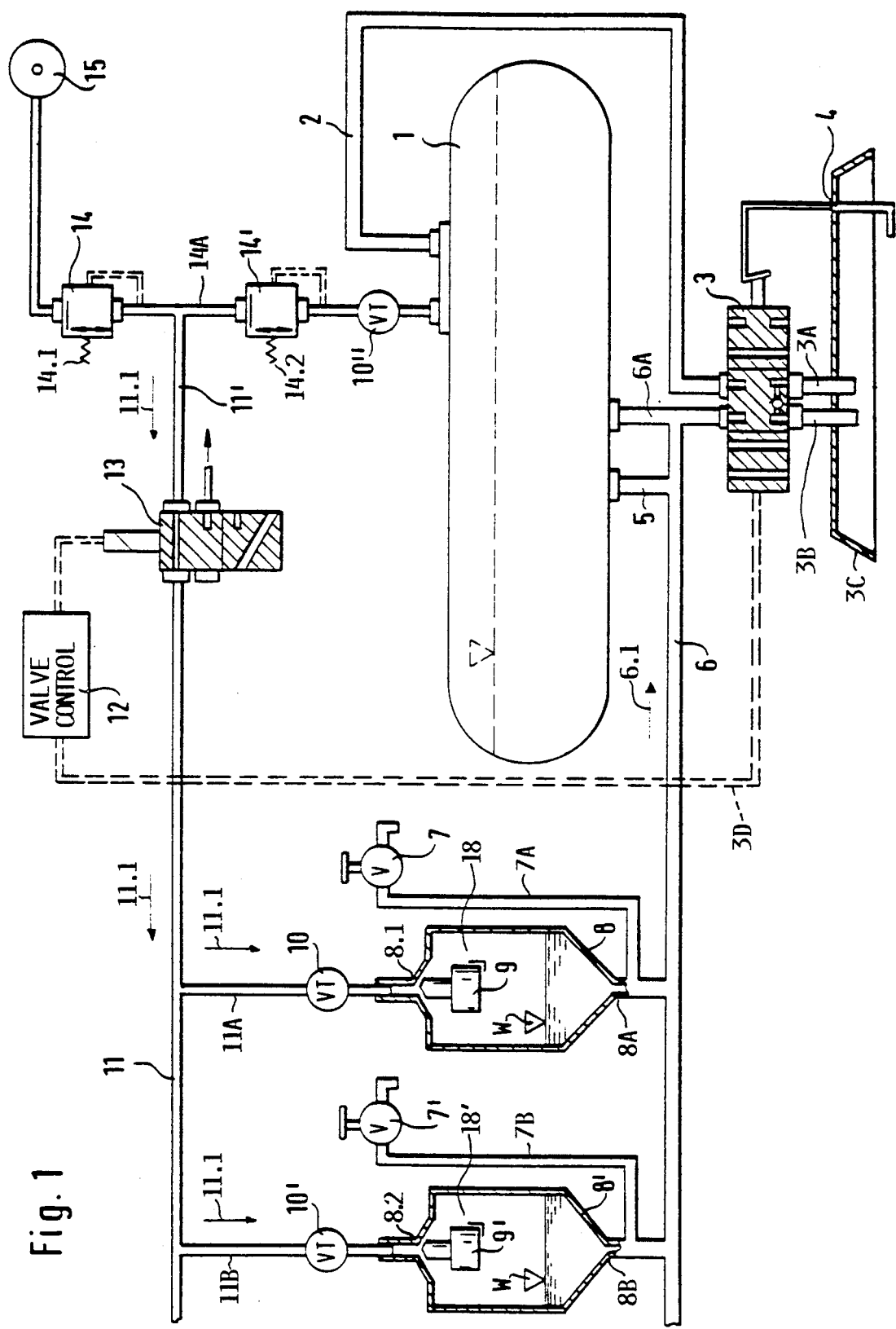
FIG. 1 shows a water supply system for an aircraft according to the invention, wherein the valves are so positioned that water from a water displacement container is moved into a supply tank.

FIG. 1 shows a water supply system according to the invention, wherein a water supply tank 1 is connected through an overflow and venting pipe 2 to one port of a multi-position filling and draining valve 3 operable manually with a handle 4. The valve 3 has a venting and overflow port 3A and a filling and inlet port 3B mounted in a panel 3C. A control connection shown in dashed lines 3D connects the valve 3 to a control unit 12 to be described in more detail below. A water supply pipe 6 is connected through a T-connector 6A to the water supply tank 1 and to a respective port of the multi-position valve 3 functioning for both filling and draining. Upstream of the T-connector 6A, the supply pipe 6 is connected to the tank 1 through a bubble trap 5, the function of which will also be described in more detail below.

At least one faucet 7, normally a plurality of such faucets, are connected through branch pipes 7A, 7B to the water supply and distribution pipe 6. Simultaneously, a first end 8A, 8B of a water displacement tank 8, 8' is connected to the respective branch pipe 7A, 7B and to the supply pipe 6. The second or upper end 8.1, 8.2 of each water displacement container 8, 8' is connected to a pressure supply pipe 11 through a respective branch pipe 11A, 11B. A throttling device 10, 10' is located in each branch pipe 11A, 11B, respectively.

The pressure supply pipe 11 is connected through a switch-over valve 13 to a pressure pipe 11' which in turn is connected to a junction 14A that interconnects two pressure controllers 14 and 14' in series with each other. The pressure controller 14 is connected with its inlet to a source 15 of pressurized gas, such as air. The outlet of the pressure controller 14 is connected to the T-junction 14A which in turn is also connected to the inlet of the second pressure controller 14' which in turn is connected through a second throttling device 10" to the tank 1. The two pressure controllers 14, 14' have pressure adjustment inputs 14.1 and 14.2.* These may be automatically controlled through the control unit 12 in closed loop fashion.
*The input values of 74.1 and 76.2 are continuously compared with the actual downstream pressures via the dashed reference pipes or 76 and 76' such facilitating a constant regulation of the downstream pressures.

The controllers 14 and 14' form a two stage pressure control system which may be a closed loop system responsive to a pressure sensor not shown.

As shown in FIG. 1, the valve 13 has been switched by the control unit 12 into a position connecting the pressure junction 14A and source 15 to pressure pipe 11. Compressed air flows as indicated by the arrows 11.1 through the pipe 11', the valve 13, the pipe 11, the branch pipes 11A and 11B and through the throttling devices 10, 10' into the water displacement containers 8, 8' thereby pushing water back through the supply pipe 6 into the tank 1 as indicated by the arrow 6.1. The control unit 12 recognizes by reason of the connection 3D, the instantaneous position of the valve 3, whereby the unit 12 shifts the valve 13 depending on the position of valve 3. When the valve 3 is closed, the valve 13 can be in the pressure passing position of FIG. 1 or in the venting position of FIG. 2 for the back and forth cycling of the water between 8, 8' and 1. The present system prevents freeze-up during flight by keeping the water continuously flowing either into the tank 1 as just described with reference to FIG. 1, or by flowing back in the opposite direction into the water displacement containers 8, 8', as will be described below with reference to FIG. 2, thereby avoiding heating the pipes and tank. The control unit 12 includes a timer which switches the valve 13 in a time sequence between the positions shown in FIG. 1 and in FIG. 2. This sequence depends on the filling level in the containers 8, 8'. As pressure enters into the containers 8, 8', as shown in FIG. 1, the water is forced back into the tank 1. The two pressure controllers 14, 14' connected in series make sure that the pressure in the pipe 11, 11' is always higher than the pressure in the tank 1 and in the supply pipe 6. The throttling devices 10, 10' make sure that a uniform emptying of all the containers 8, 8' takes place in each cycle. During the cycle shown in FIG. 1, the pressure in the pipe 6 is still sufficient for enabling the use of the faucets 7, 7'. After a predetermined elapse of time when the water level W in the containers 8, 8' has reached its lower level, the control unit 12 which is responsive to the water level in the containers 8, 8' will switch over to position the valve 13 as shown in FIG. 2.

Figure 2:
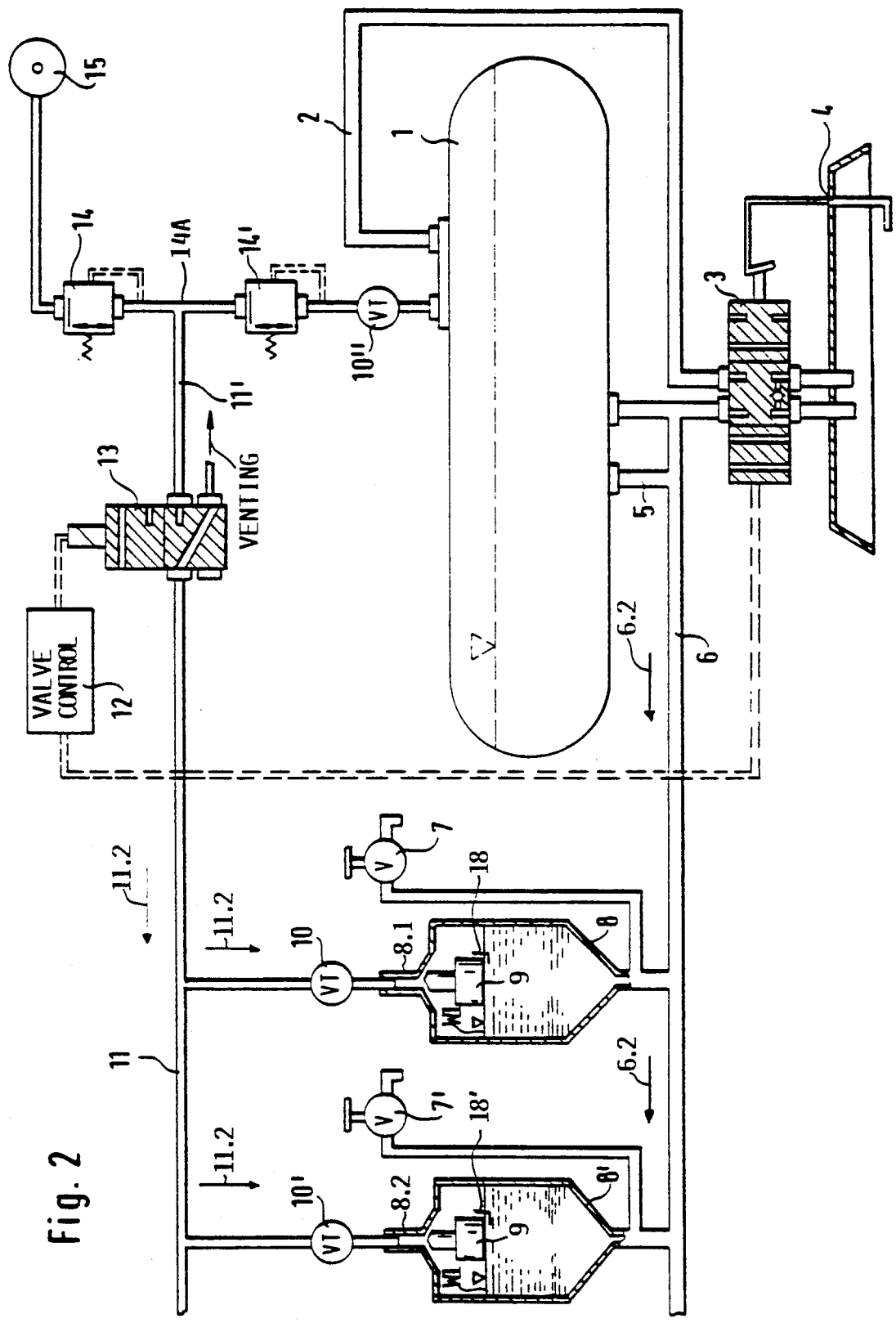
FIG. 2 shows the same system as FIG. 1, however, with water moving from the supply tank to the displacement container or containers.

Referring to FIG. 2, the arrows 6.2 show that now water flows from the tank 1 into the containers 8, 8' while air flows as indicated by the arrows 11.2 through the valve 13 to the atmosphere as indicated by the venting arrow. This flow is assured due to the fact that at this time a defined excess pressure prevails in the tank 1. Even during this phase of the present system, when air is vented through the valve 13, there is a sufficient pressure for use of the faucets 7, 7' due to the throttling devices 10, 10' which assure the required pressure in the containers 8, 8'. FIG. 2 shows substantially the end of a recycling, whereby the water level W1 in the displacement containers 8, 8' reaches its upper limit level, thereby closing the upper outlets of the respective container through float valves 9, 9' that are free to travel between the upper outlets and the stops 18, 18'. A respective signal is supplied through the control unit at this time to cause another switch-over of the valve 13 to begin a return cycle as shown in FIG. 1.

Figure 5:
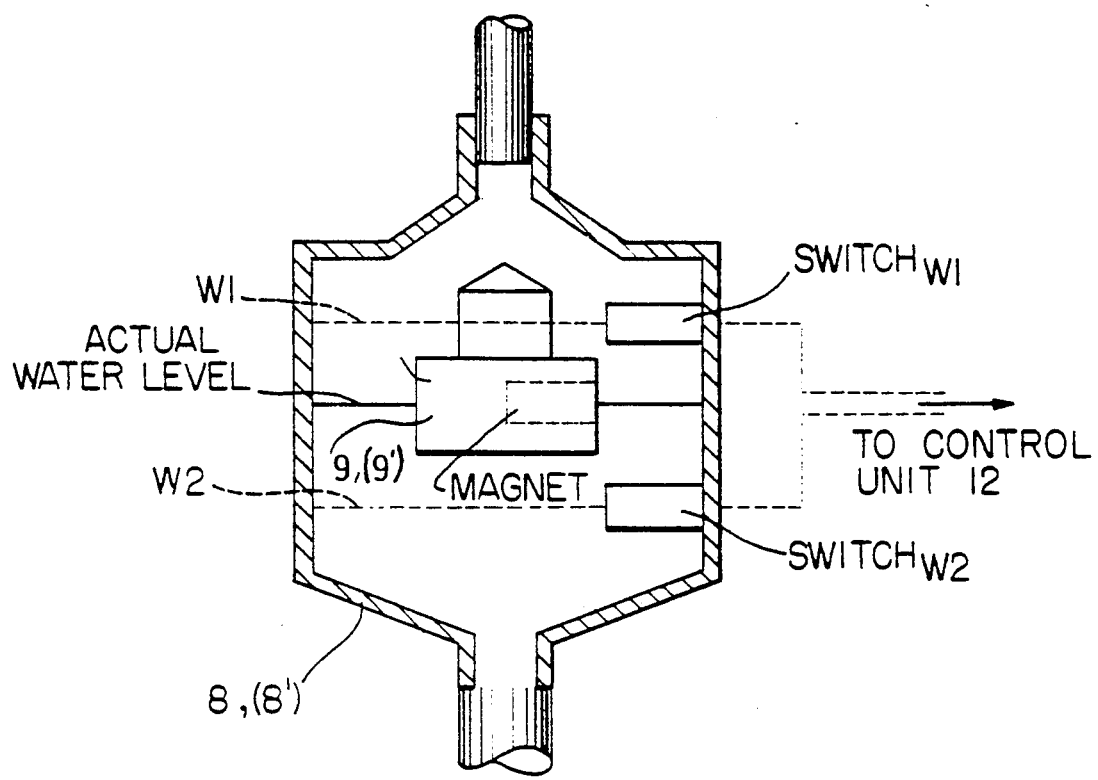
FIG. 5 shows a sensor for providing a control signal representing the water level in the water displacement tanks for controlling the system in response to such signal.

FIG. 5 shows an alternative embodiment in which the float valves 9, 9' are cooperating with signal providing elements such as magnets that operate a respective sensor to provide a corresponding electrical signal to the control unit 12 for indicating that the upper water level W1 and optionally the lower water level W2 has been reached in the displacement containers 8, 8'. In the preferred embodiment the signal sensors are electrical switches operated directly or indirectly by the float valves.

Figure 3:
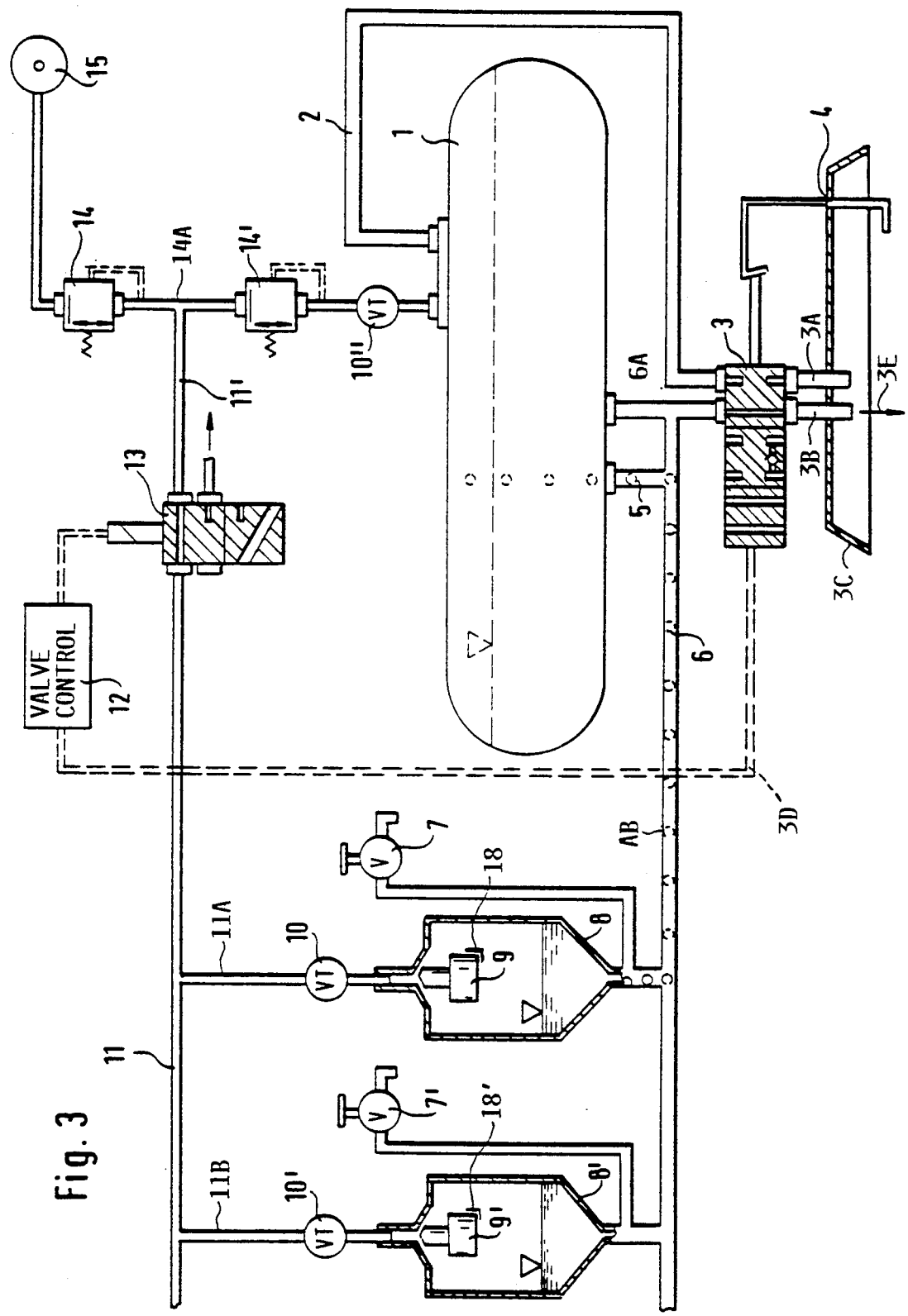
FIG. 3 shows the system with the valves positioned for a draining operation.

FIG. 3 shows the valve 3 in its draining position. The handle 4 is used to manually shift the valve 3 into the draining position. As a result, water in the tank 1 can drain out through the drainage port 3B as indicated by the arrow 3E. The venting port 3A is still closed at this time. Such draining is done when the aircraft is to be parked at freezing temperatures to avoid the need for heating the system, especially the pipe 6 and the tank 1. The manual operation of the valves 3 also transmits a signal through 3D to the valve control unit 12, so that compressed air passes through the pressure pipes 11', the valves 13, the pressure pipe 11, and the branch pipes 11A, 11B into the containers 8, 8'. This pressure facilitates the draining. Additionally, the pressure above the water level in the tank 1 enhances the draining operation. Let it be assumed that the container 8 is already empty, whereby air bubbles AB travel through the pipe 6 toward the tank 1. In order to prevent these air bubbles AB from interfering with the drainage through the T-connector 6A, a bubble trap 5 connects the pipe 6 to the tank 1 upstream of the T-connector 6A. Thus, the bubbles AB travel into the tank without reaching the connector 6A. The drainage is continued until no water comes out of the port 3B anymore, whereby all containers 8, 8' and the water tank 1 are completely emptied.

Due to the fact that the present system uses compressed air as the driving medium for the cycling of the water in the system and for the draining, the function of the system is practically independent of the installation of the pipes. Thus, it is not necessary that the pipes, especially pipe 6 has a downward slant toward a draining port. Accordingly, in the present system the pipes can be arranged horizontally, which makes it substantially easier to install the present duct system when the respective body of the aircraft is longer or shorter.

Figure 4:
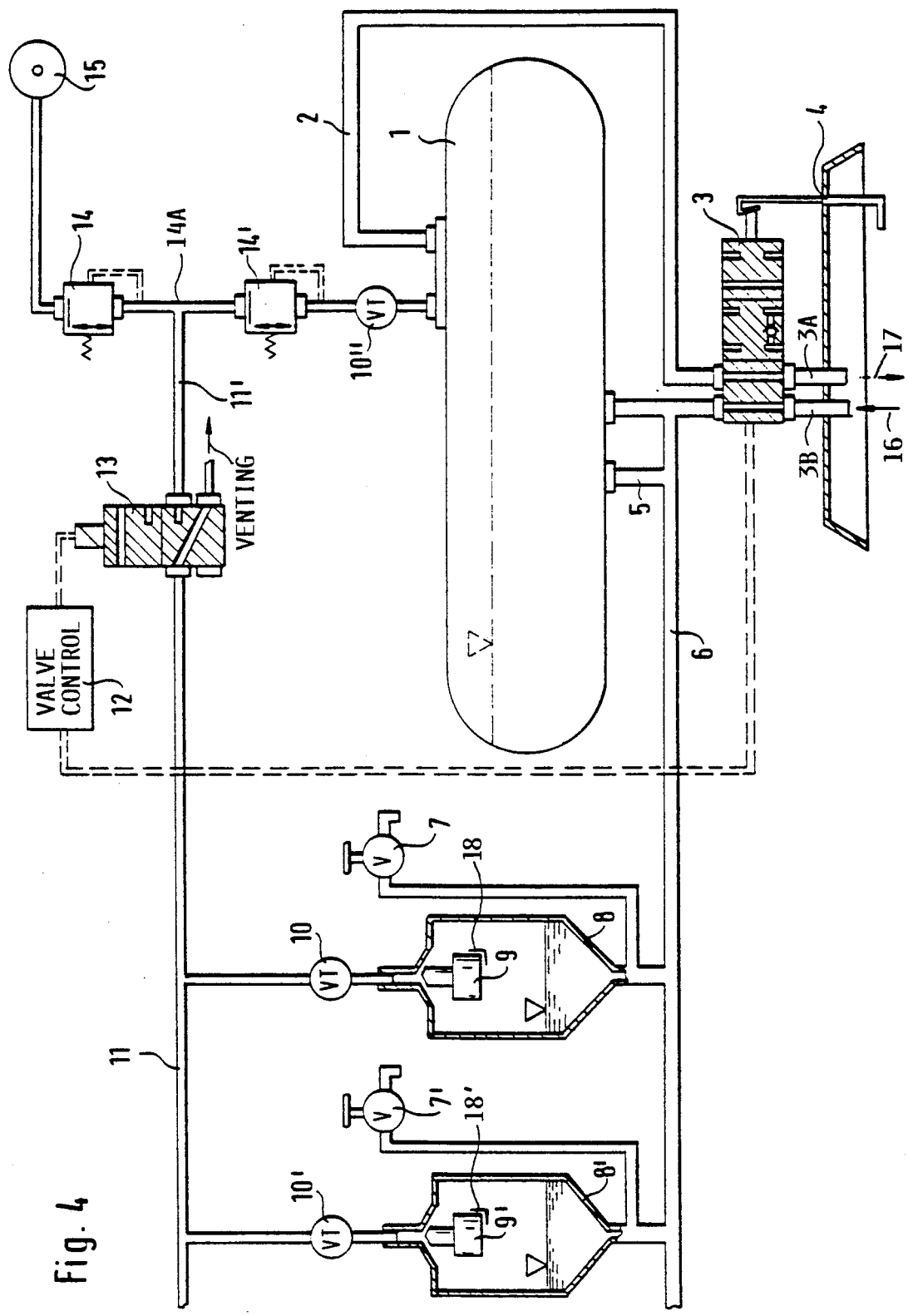
FIG. 4 shows the system with the valves positioned for filling the system with water.

FIG. 4 shows the system when it is being filled. Inlet port 3B is connected to a source of water under pressure as indicated by the arrow 16. The valve 3 has been moved into the position shown in FIG. 4, with the help of the handle 4, whereby the control unit 12 has shifted the valve 13 into the venting position, whereby the incoming water can displace air in the system which is then vented as indicated by the venting arrow 17. At this time, the venting port 3A of the valve 3 is connected to the venting and overflow pipe 2, whereby air above the water level in the tank 1 can also escape as the tank 1 is being filled. Arrow 17 indicates the venting and any overflow that will indicate that the system is full. At this time the throttling device 10" makes sure that the escape of compressed air through the tank and the pipe 2 is kept within reasonable limits.

The heat normally stored in the fresh water being filled into the system is usually considered to be sufficient to assure a trouble-free operation of the present water supply system during flight. Where the present system is used in aircraft that have exceptionally long flying times, it is possible to provide a heater for the tank 1.

Although the invention has been described with reference to specific example embodiments, it will be appreciated that it is intended to cover all modifications and equivalents within the scope of the appended claims.

What I claim is:

1. A water supply system for an aircraft, comprising a water tank for holding a water supply, at least one faucet (7) in said aircraft for discharging water, a water supply pipe (6) connecting said water tank (1) to said at least one faucet, a tank filling and draining valve (3) connected to said water tank (1) and to said water supply pipe (6), a compressed air source (15), two pressure controllers (14, 14') connected in series connection with each other to form a two stage pressure control system for connecting said compressed air source (15) to said water tank (1), said series connection forming a pressure supply junction, a water displacement container (8) connected with a first end to said at least one faucet (7) and to said water supply pipe (6), a pressure supply pipe (11) connecting a second end of said water displacement container to said pressure supply junction, a switchover valve (13) in said pressure supply pipe (11), valve control means (12) connected to said switch-over valve for alternately supplying compressed air to said displacement container (8) and to said water tank (1) for repeatedly pumping water back and forth between said water tank and said displacement container (8) to thereby prevent a freeze-up of water in said system, especially in said supply pipe.

2. The water supply system of claim 1, further comprising a flow throttling device (10) connected to said second end of said displacement container for assuring a uniform emptying of said displacement container.

3. The water supply system of claim 1, further comprising a flow throttle (10") connected between said water supply tank and one of said two pressure controllers for limiting a discharge of compressed air through said water tank when said water tank is vented.

4. The water supply system of claim 3, further comprising a venting and overflow pipe (2) connecting said water tank (1) to said tank filling and draining valve means.

5. The water supply system of claim 1, further comprising an air bubble trap (5) connecting said supply pipe (6) to said water tank.

6. The water supply system of claim 1, further comprising a T-pipe connector connecting said supply pipe and said tank filling and draining valve to said water tank.

7. The water supply system of claim 1, further comprising a T-pipe connector connecting said supply pipe and said tank filling and draining valve to said water tank, and an air bubble trap (5) connecting said supply pipe (6) to said water tank upstream of said T-pipe connector.

8. The water supply system of claim 1, further comprising float means in said displacement container for closing off the supply of pressurized air into said displacement container in response to a certain water level in said displacement container.

9. The water supply system of claim 8, further comprising sensor means operable by said float means for providing a control input signal to said control means (12) to close said switch-over valve in response to said certain water level in said displacement container.

10. The water supply system of claim 9, wherein said sensor means comprise electrical contact means operated by said float means to provide said control signal.

11. The water supply system of claim 1, comprising a plurality of faucets, a corresponding plurality of water displacement containers, each faucet being connected to its respective water displacement container, said displacement containers being connected in parallel to each other between said pressure supply pipe (11) and said water supply pipe (6).

12. The water supply system of claim 11, further comprising a branch line (10A, 10B) connecting said second end of each displacement container to said pressure supply pipe (11), and a throttling device (10, 10') in said branch line for assuring a uniform compressed air supply to said displacement container for uniformly emptying said displacement containers.

* * * * *